United States Patent [19]
Tohyama et al.

[11] Patent Number: 5,608,457
[45] Date of Patent: Mar. 4, 1997

[54] VIDEO CAMERA APPARATUS

[75] Inventors: Masamichi Tohyama; Yutaka Kohtani, both of Yokohama, Japan

[73] Assignee: Canon Kabushiki Kaisha, Tokyo, Japan

[21] Appl. No.: 535,375

[22] Filed: Sep. 28, 1995

Related U.S. Application Data

[63] Continuation of Ser. No. 245,835, May 19, 1994, abandoned, which is a continuation of Ser. No. 91,398, Jul. 13, 1993, abandoned, which is a continuation of Ser. No. 783,207, Oct. 28, 1991, abandoned.

[30] Foreign Application Priority Data

Oct. 31, 1990 [JP] Japan .................................. 2-295981
Nov. 5, 1990 [JP] Japan .................................. 2-300663

[51] Int. Cl.$^6$ ................................................ H04N 5/225
[52] U.S. Cl. .......................................... 348/335; 348/375
[58] Field of Search .............................. 348/335, 375, 348/207; 354/286; H04N 5/225

[56] References Cited

U.S. PATENT DOCUMENTS

| | | | |
|---|---|---|---|
| 4,851,897 | 7/1989 | Inuma et al. | 358/225 |
| 4,855,814 | 8/1989 | Shiraishi et al. | 358/225 |
| 4,860,113 | 8/1989 | Miyamoto et al. | 358/909 |
| 5,003,399 | 3/1991 | Ishimaru et al. | 348/375 X |
| 5,161,026 | 11/1992 | Mabuchi et al. | 358/909 |

Primary Examiner—Wendy Garber
Attorney, Agent, or Firm—Robin, Blecker, Daley & Driscoll

[57] ABSTRACT

A video camera apparatus comprises a camera unit, a lens unit detachable from the camera unit and a communication circuit for communicating control information between a computer of the camera unit and a computer of the lens unit, wherein at least one of the camera unit and the lens unit comprises a memory for storing information indicating a version of the control information by which both of the camera unit and the lens unit can communicate with each other for control, and the information representing the version can be transmitted by the memory to the other unit to vary or select the control command or contents of the control command.

19 Claims, 13 Drawing Sheets

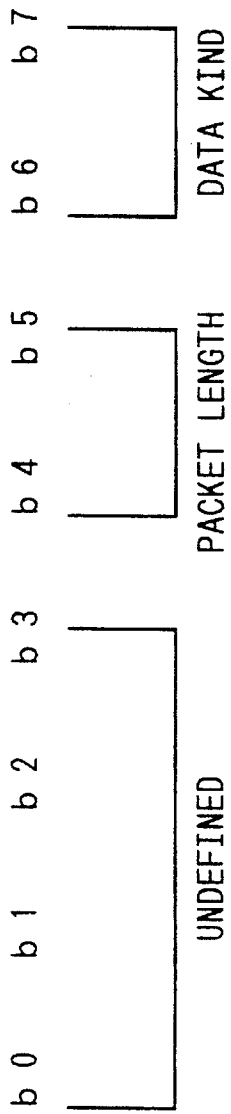

FIG. 6 (PRIOR ART)

| b6 | b7 | |
|---|---|---|
| 0 | 0 | AT INITIAL COMMUNICATION |
| 0 | 1 | CONTROL DATA |
| 1 | 0 | INFORMATION OF MANUFACTURER'S OWN (OPTION) |
| 1 | 1 | UNDEFINED |

FIG. 7 (PRIOR ART)

| b0 | b1 | b2 | b3 | b4 | b5 | b6 | b7 |
|---|---|---|---|---|---|---|---|
| CHECK CODE | | | | UNDEFINED | | | |
| 1 | 0 | 1 | 0 | DCTL | | | |
| 0 | 1 | 0 | 1 | DLTC | | | |

FIG. 8 (PRIOR ART)

| | b0 | b1 | b2 | b3 | b4 | b5 | b6 | b7 | |
|---|---|---|---|---|---|---|---|---|---|
| WORD 0 | x | x | x | x | 1 | 0 | 0 | 0 | |
| WORD 1 | 1 | 0 | 1 | 0 | x | x | x | x | |
| WORD 2 | 0 | 0 | 0 | 0 | 0 | 0 | 0 | 0 | START COMMAND |
| WORD 3 | 0 | 0 | 0 | 0 | 0 | 0 | 0 | 0 | LENS SPECIFICATION REQUEST |
| WORD 4 | 0 | 0 | 0 | 0 | 1 | 0 | 0 | 0 | UNIT SPECIFICATION REQUEST |
| WORD 5 | 1 | 0 | 0 | 0 | 1 | 0 | 0 | 0 | |
| WORD 6 | 0 | 0 | 0 | 0 | 0 | 0 | 0 | 0 | COMMANDS FOR INITIALIZATION |
| WORD 7 | 0 | 0 | 0 | 0 | 0 | 0 | 0 | 0 | |
| WORD 8 | 0 | 0 | 0 | 0 | 0 | 0 | 0 | 0 | |
| WORD 9 | 0 | 0 | 0 | 0 | 0 | 0 | 0 | 0 | |

FIG. 9 (PRIOR ART)

|        | b0 | b1 | b2 | b3 | b4 | b5 | b6 | b7 |               |
|--------|----|----|----|----|----|----|----|----|---------------|
| WORD 0 | x  | x  | x  | x  | 1  | 0  | 0  | 0  |               |
| WORD 1 | 0  | 1  | 0  | 1  | x  | x  | x  | x  |               |
| WORD 2 | 0  | 0  | 0  | 0  | 0  | 0  | 0  | 0  |               |
| WORD 3 | 0  | 0  | 0  | 0  | 0  | 0  | 0  | 0  | START COMMAND |
| WORD 4 | 0  | 0  | 0  | 0  | 0  | 0  | 0  | 0  |               |
| WORD 5 | 0  | 0  | 0  | 0  | 0  | 0  | 0  | 0  |               |
| WORD 6 | 0  | 0  | 0  | 0  | 0  | 0  | 0  | 0  |               |
| WORD 7 | 0  | 0  | 0  | 0  | 0  | 0  | 0  | 0  |               |
| WORD 8 | 0  | 0  | 0  | 0  | 0  | 0  | 0  | 0  |               |
| WORD 9 | 0  | 0  | 0  | 0  | 0  | 0  | 0  | 0  |               |

FIG. 10 (PRIOR ART)

|        | b0 | b1 | b2 | b3 | b4 | b5 | b6 | b7 |                             |
|--------|----|----|----|----|----|----|----|----|-----------------------------|
| WORD 0 | x  | x  | x  | x  | 1  | 0  | 0  | 0  |                             |
| WORD 1 | 0  | 1  | 0  | 1  | x  | x  | x  | x  |                             |
| WORD 2 | 0  | 0  | 0  | 0  | 0  | 0  | 0  | 0  |                             |
| WORD 3 | 0  | 0  | 0  | 0  | 1  | 0  | 0  | 0  | LENS SPECIFICATION REQUEST  |
| WORD 4 | MANUFACTURER NUMBER        |||||||| CODE IS UNDEFINED           |
| WORD 5 | LENS NUMBER                |||||||| CODE IS UNDEFINED           |
| WORD 6 | PRESENCE/ABSENCE OF UNIT   ||||||||                             |
| WORD 7 | 0  | 0  | 0  | 0  | 0  | 0  | 0  | 0  |                             |
| WORD 8 | 0  | 0  | 0  | 0  | 0  | 0  | 0  | 0  |                             |
| WORD 9 | 0  | 0  | 0  | 0  | 0  | 0  | 0  | 0  |                             |

FIG. 11 (PRIOR ART)

|        | b0 | b1 | b2 | b3 | b4 | b5 | b6 | b7 |                            |
|--------|----|----|----|----|----|----|----|----|----------------------------|
| WORD 0 | x  | x  | x  | x  | 1  | 0  | 0  | 0  |                            |
| WORD 1 | 0  | 1  | 0  | 1  | x  | x  | x  | x  |                            |
| WORD 2 | UNIT NUMBER |||||||||                                      |
| WORD 3 | 1  | 0  | 0  | 0  | 1  | 0  | 0  | 0  | UNIT SPECIFICATION REQUEST |
| WORD 4 | SPECIFICATION   MIN VALUE   (LOWER) |||||||||
| WORD 5 | SPECIFICATION   MIN VALUE   (UPPER) |||||||||
| WORD 6 | SPECIFICATION   MAX VALUE   (LOWER) |||||||||
| WORD 7 | SPECIFICATION   MAX VALUE   (UPPER) |||||||||
| WORD 8 | CONTROL FUNCTION INFORMATION |||||||||
| WORD 9 | ABSOLUTE AREA EFFECTIVE BIT |||||||||

FIG. 12 (PRIOR ART)

| b0 | b1 | b2 |        | FUNCTION  |
|----|----|----|--------|-----------|
| 0  | 0  | 0  | UNIT 0 | AF        |
| 1  | 0  | 0  | UNIT 1 | IRIS      |
| 0  | 1  | 0  | UNIT 2 | ZOOM      |
| 1  | 1  | 0  | UNIT 3 | UNDEFINED |
| 0  | 0  | 1  | UNIT 4 | UNDEFINED |
| 1  | 0  | 1  | UNIT 5 | UNDEFINED |
| 0  | 1  | 1  | UNIT 6 | UNDEFINED |
| 1  | 1  | 1  | UNIT 7 | UNDEFINED |

FIG. 13 (PRIOR ART)

|        | b0 | b1 | b2 | b3 | b4 | b5 | b6 | b7 |
|--------|----|----|----|----|----|----|----|----|
| WORD 0 | x  | x  | x  | x  | 1  | 0  | 0  | 0  |
| WORD 1 | 1  | 0  | 1  | 0  | x  | x  | x  | x  |
| WORD 2 | UNIT NUMBER ||||||||
| WORD 3 | COMMANDS FOR CONTROL ||||||||
| WORD 4 | CONTROL AMOUNT (IF NECESSARY ACCORDING TO COMMAND) ||||||||
| WORD 5 | CONTROL AMOUNT (IF NECESSARY ACCORDING TO COMMAND) ||||||||
| WORD 6 | UNIT NUMBER ||||||||
| WORD 7 | COMMANDS FOR CONTROL ||||||||
| WORD 8 | CONTROL AMOUNT (IF NECESSARY ACCORDING TO COMMAND) ||||||||
| WORD 9 | CONTROL AMOUNT (IF NECESSARY ACCORDING TO COMMAND) ||||||||

- WORD 0–1: 2 BYTES
- WORD 2–5: 4 BYTES
- WORD 6–9: 4 BYTES

FIG. 14 (PRIOR ART)

|  | b0 | b1 | b2 | b3 | b4 | b5 | b6 | b7 |  |
|---|---|---|---|---|---|---|---|---|---|
| WORD 0 | x | x | x | x | 1 | 0 | 1 | 0 | ⎤ 2 BYTES |
| WORD 1 | 0 | 1 | 0 | 1 | x | x | x | x | ⎦ |
| WORD 2 | UNIT NUMBER ||||||||  ⎤ |
| WORD 3 | STATUS |||||||| |
| WORD 4 | AREA DATA |||||||| 4 BYTES |
| WORD 5 | MOVEMENT AMOUNT |||||||| ⎦ |
| WORD 6 | UNIT NUMBER |||||||| ⎤ |
| WORD 7 | STATUS |||||||| |
| WORD 8 | AREA DATA |||||||| 4 BYTES |
| WORD 9 | MOVEMENT AMOUNT |||||||| ⎦ |

FIG. 15

| b7 | RESPONSE TO COMMAND |
|---|---|
| 0 | RESPONSE TO COMMAND IS POSSIBLE |
| 1 | RESPONSE TO COMMAND IS IMPOSSIBLE |

FIG. 16

| | b5 b6 b7 BIT | PRESENCE/ABSENCE OF VERSION-UP | RESPONSE TO ALL OF VERSION-UP | CONTENTS OF WORD 4-9 | NOTE |
|---|---|---|---|---|---|
| (a) | 0 0 0 | ABSENT | POSSIBLE | PRIOR INFORMATION | — |
| (b) | 0 0 1 | — | — | — | REQUEST OF ANOTHER COMMAND |
| (c) | 0 1 0 | — | — | ALL 0 | UNDEFINED |
| (d) | 0 1 1 | — | — | — | UNDEFINED |
| (e) | 1 0 0 | — | — | — | UNDEFINED |
| (f) | 1 0 1 | PRESENT | POSSIBLE | VERSION INFORMATION | — |
| (g) | 1 1 0 | — | — | — | UNDEFINED |
| (h) | 1 1 1 | PRESENT | IMPOSSIBLE | VERSION INFORMATION | — |

FIG. 17

|        | b0 | b1 | b2 | b3 | b4 | b5 | b6 | b7 |
|--------|----|----|----|----|----|----|----|----|
| WORD 0 | —  | —  | —  | —  | —  | —  | —  | —  |
| WORD 1 | —  | —  | —  | —  | —  | —  | —  | —  |
| WORD 2 | —  | —  | —  | —  | —  | —  | —  | —  |
| WORD 3 | —  | —  | —  | —  | —  | —  | —  | —  |
| WORD 4 | 2  | 3  | 4  | 5  | 6  | 7  | 8  | 9  |
| WORD 5 | 10 | 11 | 12 | 13 | 14 | 15 | 16 | 17 |
| WORD 6 | 18 | 19 | 20 | 21 | 22 | 23 | 24 | 25 |
| WORD 7 | 26 | 27 | 28 | 29 | 30 | 31 | 32 | 33 |
| WORD 8 | 34 | 35 | 36 | 37 | 38 | 39 | 40 | 41 |
| WORD 9 | 42 | 43 | 44 | 45 | 46 | 47 | 48 | 49 |

FIG. 18

|  | b0 | b1 | b2 | b3 | b4 | b5 | b6 | b7 |  |
|---|---|---|---|---|---|---|---|---|---|
| WORD 0 | — | — | — | — | — | — | — | — |  |
| WORD 1 | — | — | — | — | — | — | — | — |  |
| WORD 2 | — | — | — | 0 | 0 | 1 | 0 | 1 | ※ |
| WORD 3 | — | — | — | — | — | — | — | — |  |
| WORD 4 | 1 | 0 | 1 | 0 | 1 | 0 | 0 | 1 |  |
| WORD 5 | 0 | 0 | 0 | 1 | 0 | 0 | 0 | 0 |  |
| WORD 6 | 0 | 0 | 0 | 0 | 0 | 0 | 0 | 0 |  |
| WORD 7 | 0 | 0 | 0 | 0 | 0 | 0 | 0 | 0 |  |
| WORD 8 | 0 | 0 | 0 | 0 | 0 | 0 | 0 | 0 |  |
| WORD 9 | 0 | 0 | 0 | 0 | 0 | 0 | 0 | 0 |  |

VIDEO CAMERA APPARATUS

This is a continuation application under 37 CFR 1.62 of prior application Ser. No. 08/245,835 filed on May 19, 1994, now abandoned, which is a continuation of Ser. No. 08/091,398 filed Jul. 13, 1993, now abandoned, which is a continuation of Ser. No. 07/783,207 filed Oct. 28, 1991, now abandoned.

BACKGROUND OF THE INVENTION

1. Field of the Invention

The present invention relates to a video camera system with a detachable lens unit.

2. Related Background Art

Recent innovations of video equipment, e.g., video cameras, allow improved operability, and multi-functions. Recently, a remarkable one of such innovations concerns an exchangeable lens of a video camera.

In a video camera system of this type, both a camera unit and a lens unit detachable from the camera unit incorporate microcomputers, and bidirectional communications of control information are made between these units. Thus, the camera unit controls focus, iris, zoom functions, and the like in the lens unit.

More specifically, a control information communication system according to predetermined agreements is employed, in which the camera unit fetches various pieces of information from the lens unit, and transmits a control command to the lens unit, thereby controlling the lens unit.

However, in this prior art, if the control method of the focus, iris, zoom functions, and the like in the lens unit is improved in the future, and a new function is added, or if the format of control information is changed, and the control information communication system based on the above-mentioned agreements undergoes version-up, i.e., updating of capabilities, compatibility between the old and new versions is not assured. When the camera unit and the lens unit have different versions, a control command from the camera unit may not be decoded by the lens unit, or wrong control may be made. When products of both the old and new versions are present on the market, compatibility between camera units and lens units cannot be realized. Such situation not only confuses users, but also considerably impairs the degree of accomplishment of the system itself.

SUMMARY OF THE INVENTION

The present invention has been made to solve the above-mentioned problems, and has as its first object to provide a video camera apparatus, which allows smooth control free from erroneous operations even when a lens unit and a camera unit have different versions.

It is the second object of the present invention to provide a video camera apparatus, in which a lens unit transmits its version information to a camera unit, so that the camera unit can make control corresponding to the lens unit.

In order to achieve the above objects, according to a preferred aspect of the present invention, there is disclosed a video camera apparatus, which comprises a camera unit, a lens unit detachable from the camera unit, and communication means for communicating control information between the camera unit and the lens unit, wherein at least one of the camera unit and the lens unit comprises means for storing information representing a version of a content of the control information communicated by the communication means, and the information representing the version can be transmitted to the other unit by the communication means.

According to another preferred aspect of the present invention, there is disclosed a video camera apparatus, which comprises a camera unit, a lens unit detachable from the camera unit, and communication means for communicating control information between the camera unit and the lens unit, wherein at least one of the camera unit and the lens unit comprises an information table for storing information representing a version of the control information to be communicated, and means for, when the communication means communicates the control information between the camera unit and the lens unit, setting a discrimination flag indicating whether or not a content of the control information to be communicated is the information representing the version from the information table.

According to still another preferred aspect of the present invention, there is disclosed a lens unit detachable from a camera unit, comprising control means for receiving a control command transmitted from the camera unit, and performing various control operations, discrimination means for discriminating whether a response can be made to a version of the command, and means for transmitting information representing a version of the control means to the camera unit.

In this manner, since the communication means for communicating control information between the lens unit and the camera unit transmits information associated with the version of the lens unit to the camera unit, the camera unit can transmit a command suitable for the version of the attached lens unit to the lens unit so as to control the lens unit. Thus, compatibility between units having different versions can be assured.

Other objects and features of the present invention will be apparent from the following description taken in conjunction with the accompanying drawings.

BRIEF DESCRIPTION OF THE DRAWINGS

FIG. 4 is a view showing the format (word 0) of a header portion in control information to be communicated;

FIG. 5 is a view for explaining the format (bit 4 and bit 5 of word 0) of the header portion;

FIG. 6 is a view for explaining the format (bit 6 and bit 7 of word 0) of the header portion;

FIG. 7 is a view for explaining the format (word 1) of the header portion;

FIG. 8 is a view showing a content of a control information signal DCTL in an initial communication;

FIG. 9 is a view for explaining a content of a status signal DLTC, which is returned in response to a start command in information DCTL transmitted from the camera unit in the initial communication;

FIG. 10 is a view for explaining a content of a status signal DLTC, which is returned in response to a lens specification request command in information DCTL transmitted from the camera unit in the initial communication;

FIG. 11 is a view for explaining a content of a status signal DLTC, which is returned in response to a unit specification request command in information DCTL transmitted from the camera unit in the initial communication;

FIG. 12 is a view for explaining definition of unit numbers in DLTC in the initial communication;

FIG. 13 is a view for explaining a content of a signal DCTL in a control communication;

FIG. 14 is a view showing a content of a signal DLTC, which is returned in response to a signal DCTL in the control communication;

FIG. 15 is a view for explaining a data format for making a response to versions of the lens unit and the camera unit or a request of another command due to a command error using bits of the signal DLTC to be transmitted from the lens unit to the camera unit in the initial communication;

FIG. 16 is a view showing the second embodiment for explaining a data format for making a response to versions of the lens unit and the camera unit or a request of another command due to a command error using bits of the signal DLTC to be transmitted from the lens unit to the camera unit in the initial communication;

FIG. 17 is a view showing a version information table showing a correspondence among various versions formed using words and bits of a signal DLTC to be transmitted from a lens unit to a camera unit in an initial communication according to the third embodiment of the present invention; and FIG. 18 is a view showing a data format for distinguishing version information of the lens unit and the camera unit from other pieces of information or making a request of another command due to a command error using bits of a signal DLTC to be transmitted from the lens unit to the camera unit in the initial communication.

DETAILED DESCRIPTION OF THE PREFERRED EMBODIMENTS

A video camera apparatus according to the first embodiment of the present invention will be described in detail hereinafter with reference to the accompanying drawings.

Figure 1:
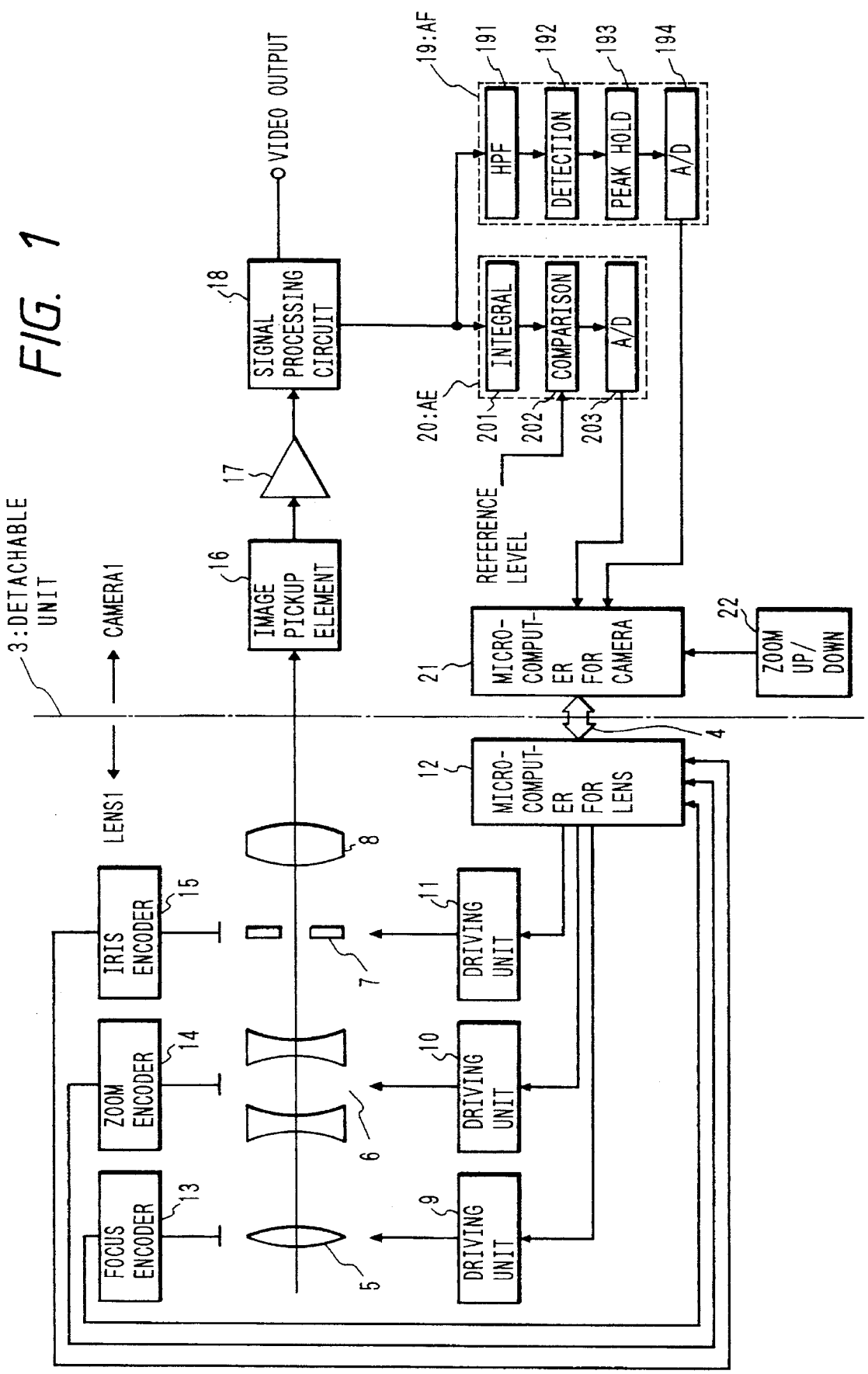
FIG. 1 is a block diagram for explaining a basic arrangement of a video camera apparatus according to the present invention.

FIG. 1 is a block diagram showing a basic arrangement of an exchangeable lens type video camera apparatus.

In FIG. 1, the apparatus includes a lens unit 1, and a camera unit 2. The lens unit 1 is detachable from the camera unit 2 via a detachable unit 3. When the lens unit is attached to the camera unit, a power supply terminal $V_{BAT}$ for supplying a power supply voltage from the camera unit to the lens unit, and a ground line GND terminal are respectively connected to the corresponding terminals of the lens unit. Thus, a power supply voltage can be supplied from the camera unit to the lens unit, and electrical contacts arranged in the detachable unit 3 form a communication transmission line 4 for performing various bidirectional communications of, e.g., initialization information, control information, and the like.

The communication transmission line is defined by a DCTL (Data-Camera to Lens) terminal for transmitting data from the camera unit to the lens unit, a DLTC (Data-Lens to Camera) terminal for sending back data from the lens unit to the camera unit, an SCLK (Serial Clock) terminal for supplying a clock signal for achieving serial synchronization upon a serial communication of control information between the camera unit and the lens unit, and a CS (Chip Select) terminal for supplying a chip select signal serving as a trigger signal for informing the start of a communication from the camera unit as a master unit of a serial communication to the lens unit as a slave unit of the serial communication.

The lens unit 1 includes a lens group consisting of a focusing lens 5 for performing a focusing operation, a zoom lens 6 for varying a magnification to perform a zoom operation, an iris (aperture stop) 7, a relay lens 8, and the like. The lens unit 1 also includes driving units 9, 10, and 11, each comprising a motor and a driving circuit, for respectively driving the focusing lens, the zoom lens, and the iris. These driving units are controlled on the basis of control information supplied from the camera unit through the communication transmission line 4 by a control microcomputer 12 for systematically making all the control operations of the lens unit. The operation states of the focusing lens, the zoom lens, and the iris are respectively detected by a focus encoder 13, a zoom encoder 14, and an iris encoder 15, and are fetched by the microcomputer 12 for the lens unit. The detection data are subjected to predetermined processing as needed, and are then transmitted to the camera unit through the communication transmission line 4.

The camera unit 2 includes an image pickup element 16 such as a CCD for photoelectrically converting an object image formed by the attached lens unit 1 into a video signal, a pre-amplifier 17 for amplifying the video signal output from the image pickup element 16 to a predetermined level, a signal processing circuit 18 for converting the video signal output from the image pickup element 16 into a standardized television signal by executing predetermined processing, such as predetermined gamma correction, blanking processing, addition of a synchronization signal, and the like, and outputting the television signal, an AF circuit 19 for detecting a focusing state on the basis of a high-frequency component of a luminance signal in the video signal, an AE circuit 20 for comparing an average value of luminance signal levels of the video signal with a given reference level, and outputting a signal for controlling the iris, so that the luminance signal levels are always equal to the reference level, a control microcomputer 21 for systematically controlling all the functions of the camera unit, a zoom switch 22 for generating an instruction for operating the zoom lens, and the like. A focusing state detection signal output from the AF circuit 19, an iris state detection signal output from the AE circuit 20, and an operation signal of the zoom switch 22 are supplied to the microcomputer 21. The microcomputer 21 performs predetermined calculations with reference to pieces of information of the operation states sent back from the lens unit so as to convert the input signals into a format to be supplied to the lens unit. Thereafter, the converted signals are transmitted to the lens unit through the communication transmission line 4, thus controlling the lens unit.

The respective functions will be briefly described below. In the AF circuit 19, a high-pass filter (HPF) 191 extracts a high-frequency component of a luminance signal in a video signal, which changes according to a focusing state. A detection circuit 192 detects the extracted components to convert it into a DC level. A peak hold circuit 193 detects a peak value of the DC level for each predetermined period. An A/D converter 194 converts the peak value into a digital signal. The digital signal is supplied to the microcomputer 21. The microcomputer 21 detects the peak value of the high-frequency component for each predetermined period, calculates control information for driving the focusing lens in a direction to maximize the peak value with reference to iris information from the lens unit in consideration of a depth of field, and outputs the calculated information to the lens unit.

In the AE circuit 20, a comparison circuit 202 compares light amount information obtained by integrating luminance signal components YC-separated by, e.g., a low-pass filter in the signal processing circuit by an integral circuit 201 with a predetermined reference amount level. An A/D converter 203 converts difference information into a digital signal. The digital signal is supplied to the microcomputer 21. The microcomputer 21 generates a control signal for driving the iris, so that the luminance signal level coincides with the reference amount level.

In the lens unit, the iris driving unit is driven based on the control signal. As a result, a control loop is formed, so that the amount of light input to the camera unit is changed, and a proper aperture value is finally obtained.

The functions in the lens unit and the camera unit are arranged as described above. A communication of control information between the lens unit and the camera unit will be described below.

Note that communication and control operations of control information to be described below are executed between the microcomputers in the lens unit and the camera unit.

Figure 2:
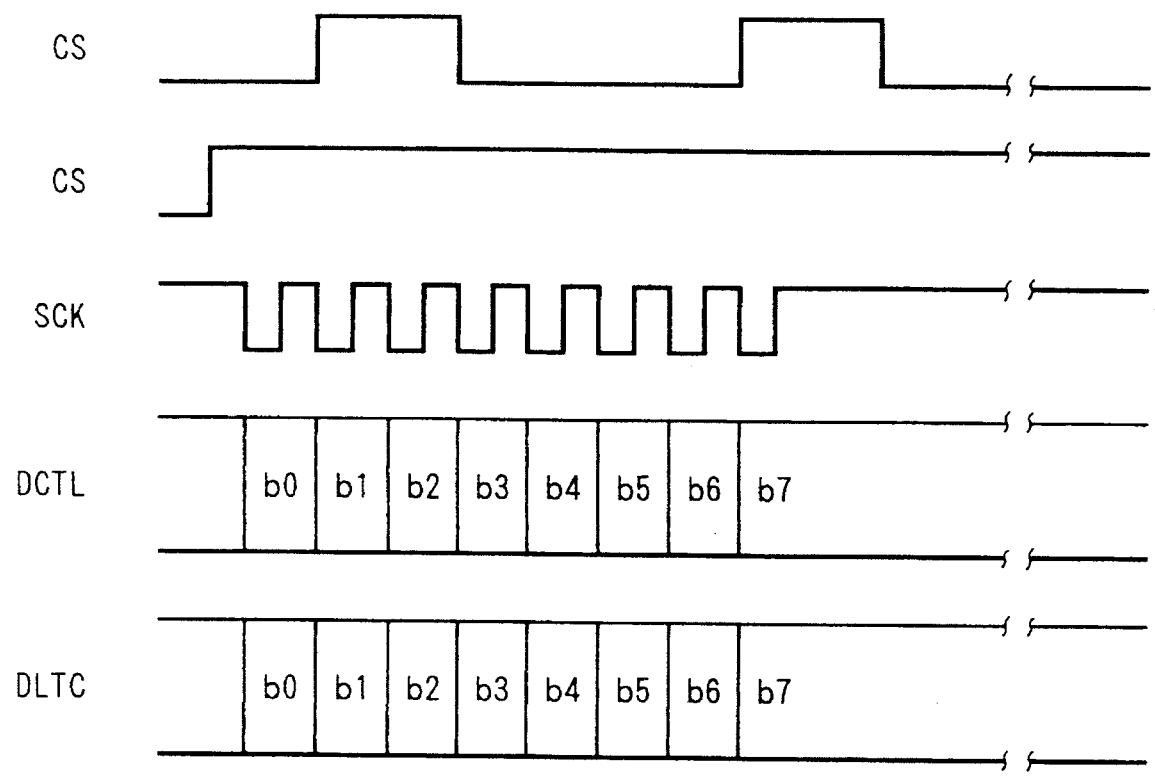
FIG. 2 is a timing chart showing a communication timing of control information between a camera unit and a lens unit.

FIG. 2 is a communication control timing chart between the camera unit and the lens unit.

A communication of control information is serially performed in synchronism with a vertical synchronization signal in consideration of processing of a video signal, and is bidirectionally performed once in one field.

The microcomputer for the lens unit serves as a slave microcomputer, and the microcomputer for the camera unit serves as a master microcomputer. Bidirectional communications are performed during a period wherein the chip select signal CS is ON.

A communication is performed in synchronism with a clock signal transmitted from the camera unit through the serial clock terminal SCLK. A lens control information signal DCTL is transmitted from the camera unit to the lens unit through the DCTL terminal. A status signal indicating a control state of the lens unit is transmitted as a signal DLTC from the lens unit to the camera through the DLTC terminal.

The control information signal and the status signal to be transmitted in this communication are arranged as packets. When the chip select signal CS is output after an elapse of a predetermined period of time in synchronism with the vertical synchronization signal, data communications DCTL and DLTC between the camera unit and the lens unit are repetitively executed in units of predetermined numbers of communication words in synchronism with the serial clock signals SCLK.

Figure 3:
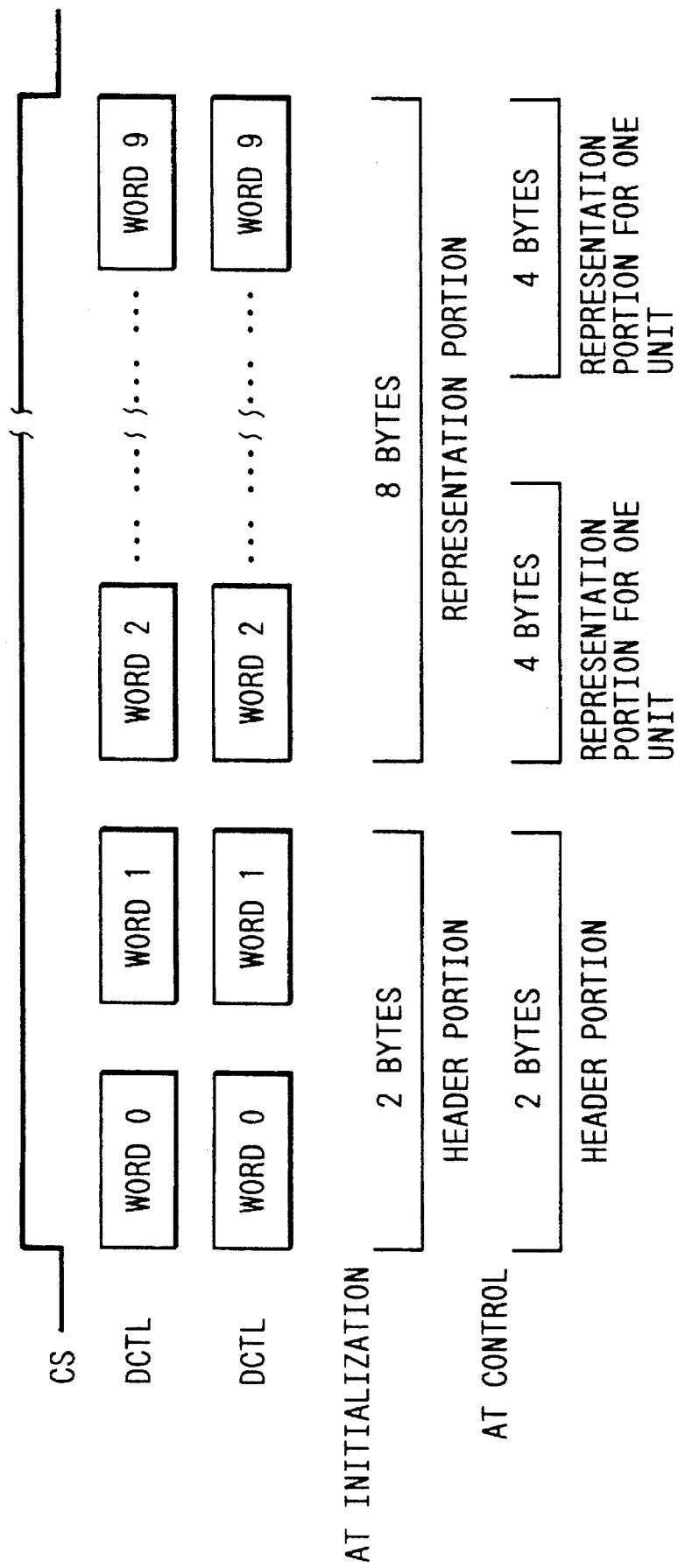
FIG. 3 is a timing chart for explaining the format of a communication packet.

FIG. 3 shows the formats of the communication packets.

Communications between the camera unit and the lens unit include an initial communication mode executed in an initialization for recognizing specifications of the lens unit in the camera unit at the beginning of the operation, and performing control on the basis of the specifications, and a control communication mode executed in an actual control operation state after the initialization is completed.

In the initial communication mode executed at the beginning of the communication, a packet consists of a 2-byte header portion, and an 8-byte representation portion (including an operand). In the control communication mode, a packet consists of a 2-byte header portion, and representation portions corresponding to a plurality of control units (objects for controlling the lens unit from the camera unit side, e.g., the iris, the zoom lens, the focusing lens, and the like will be referred to as control units hereinafter).

The 2-byte header portion consists of 1-byte word 0 and word 1, and the following representation portion consists of a total of 8 bytes of words, i.e., word 2 to word 9.

FIGS. 4, 5, and 6 respectively show the content of word 0 as the start word of the header portion.

Word 0 represents a packet length, and a kind of communication data.

The content of word 0 in the header portion consists of 8 bits, i.e., bit b0 to bit b7, as shown in FIG. 4. Two bits, i.e., bit b4 and bit b5 represent the packet length of a communication, two bits, i.e., bit b6 and bit b7 represent the data kind of a communication, and bit b0 to bit b3 are undefined.

More specifically, as shown in FIG. 5, combinations of 1 and 0 of bit b4 and bit b5 represent a packet length=6 bytes (1 unit), a packet length=10 bytes (2 units), a packet length= 14 bytes (3 units), and a packet length=18 bytes (4 units). The packet length and a control unit length have a relation "packet length=(4n+2) bytes: n is the number of the unit" therebetween.

As shown in FIG. 6, the data kind represents "at initial communication", "control data", "information of manufacturer's own (option)", or "undefined" according to the states of bit b6 and bit b7.

FIG. 7 shows the content of word 1 in the header portion.

Word 1 is a check code for checking whether or not a communication is normal. Four bits, i.e., bit b0 to bit b3 express a check code for DCTL or DLTC.

When the lens unit is attached to the camera unit, the initial communication is started according to the timing chart shown in FIG. 2.

In the initial communication mode, bidirectional communications consisting of the following three commands and pieces of response information corresponding to the commands are performed as follows.

(1) The camera unit transmits a start command for stating the start of control to the lens unit, and the lens unit transmits the corresponding status signal, i.e., various pieces of control information of the lens unit to the camera unit in a communication of the next field.

(2) The camera unit sends a specification request command for requesting information associated with various specifications such as the configuration of control units of the lens unit to the lens unit, and the lens unit sends the corresponding status signal in a communication of the next field.

(3) The camera unit sends a unit specification command in units of control units of the lens unit to the lens unit, and the lens unit sends the corresponding status signal in a communication of the next field.

Upon completion of the initial communication mode, the control communication mode for actually controlling various control units in the lens unit by the camera unit is started. In the control communication mode, the camera unit sends control commands to the respective units in the lens unit on the basis of pieces of information obtained in the initial communication mode, and the lens unit sends back status signals of the respective control units.

FIG. 8 shows the content of the control signal DCTL in the initial communication mode.

As can be apparent from FIG. 8, word 3 expresses the start command, the lens specification request command, or the unit specification request command.

FIG. 9 shows the content of the status signal DLTC as response information of the lens unit in response to the start command transmitted from the camera unit in the initial communication mode.

FIG. 10 shows the content of the status signal DLTC in response to the lens specification request command transmitted from the camera unit to the lens unit in the initial communication mode.

More specifically, the lens specification request is sent back in word 3, and manufacturer number information in word 4, lens number information in word 5, and information of the presence/absence of a unit in word 6 are sent back to the camera unit as status information.

FIG. 11 shows the content of the status signal DLTC in response to the unit specification request command, transmitted from the camera unit to the lens unit in the initial communication mode, for requesting the unit specifications in the lens unit.

A unit is designated using 3 bits out of 8 bits of word 2. Word 3 indicates the unit specification request, and word 4 to word 7 respectively indicate MIN and MAX values of corresponding specifications as upper and lower bits. Word 9 indicates an effective bit of an absolute area.

FIG. 12 shows definitions of the control units, i.e., the focusing lens, the iris, and the zoom lens. Each definition is expressed by three bits, i.e., bit b0 to bit b2 of word 2 shown in FIG. 11.

FIG. 13 shows the content of the control command DCTL transmitted from the camera unit to the lens unit in the control communication mode. The control units such as the focusing lens, the iris, and the zoom lens (power zoom) are controlled according to commands from the camera unit in the control communication mode.

As shown in FIG. 13, two bytes consisting of word and word 1 correspond to a header portion, and word 2 to word 9 correspond to control data. Word 2 indicates a unit number to be controlled, word 3 indicates a corresponding control command, and word 4 and word 5 indicate control amounts if the command in word 3 requires the control amounts.

Word 6 to word 9 respectively indicate a unit number to be controlled, a corresponding control command, and control amounts as in word 2 to word 5.

FIG. 14 shows the content of the status signal DLTC to be sent back from the lens unit to the camera unit in response to the signal DCTL transmitted from the camera unit to the lens unit in the control communication mode shown in FIG. 13.

In FIG. 14, two bytes consisting of word 0 and word 1 correspond to a header portion, and four bytes consisting of word 2 to word 5 respectively indicate a unit number to be controlled, a status signal indicating a corresponding control state, area data, and a movement amount detected by the corresponding encoder. Word 6 to word 9 also correspond to information indicating status of the corresponding control unit like in word 2 to word 5.

The bidirectional communications of the signals DCTL and DLTC are performed between the camera unit and the lens unit on the basis of the above-mentioned data formats, so that the focusing lens, the iris, the zoom lens (power zoom), and the like can be controlled on the basis of commands from the camera unit.

The control method of the lens functions may be improved in future according to technical innovations and improvement of the lens or camera unit or users' needs. Such improvement is inevitable since the lens unit is exchangeable.

For example, speed control in an auto focus (AF) system will be exemplified below. In the (AF) system of the existing video camera, a speed for moving the focusing lens from a 1.2 m position to an infinity position is about 1.5 sec even in a fast model.

Therefore, in a DCTL communication in the control communication mode in FIG. 13, a control command for the focus unit is defined in consideration of the performance of about 1.5 sec. For example, the control command is defined in 16 stages between 0.5 sec and 100 sec.

However, an AF system, which uses an actuator for moving a focusing lens from a 1.2 m position to an infinity position at a high speed of about 0.01 sec, and can quickly focus on an arbitrary object in a scene wherein both near and far objects are present in a frame, may be proposed. If this system appears in future, a command different from the current command is defined as the control command for the focus unit shown in FIG. 13, so that a new lens unit can be controlled.

To define the new command means version-up, the system before version-up is assumed to be a system of the 1st version, the new command is a command of the 2nd version. An exchangeable lens system of the 2nd version can be configured using the new command.

At this time, both lens and camera units of the 2nd version and lens and camera units of the original 1st version are present on the market. The lens and camera units of the 2nd version must be able to execute the commands of the 1st version under the notion of compatibility with lower versions.

However, the following problems are posed in this case.

More specifically, since the above-mentioned communication system does not include version information of a system, confusion occurs upon combination of lens and camera units having different versions although a combination of lens and camera units having the same version does not pose any problem.

For example, when the lens unit of the 1st version is attached to the camera unit of the 2nd version, even if a command of the 2nd version is received from the camera unit, the lens unit of the 1st version cannot respond to the command since it does not have a performance or function of responding to the command.

The lens unit cannot inform a response impossible state to the camera unit, and the camera unit cannot detect the version of the lens unit.

The present invention can solve these problems by the following arrangement.

More specifically, a means for informing, to the camera unit, whether or not the lens unit can respond to a command to be transmitted from the camera unit to the lens unit, is arranged, so that the camera unit can accurately control the lens unit.

Furthermore, version information is stored in the lens unit. The version information is transmitted from the lens unit to the camera unit in the initial communication mode, thereby solving the above-mentioned problems.

The detailed means will be described hereinafter.

FIG. 15 shows an embodiment. In this embodiment, a flag indicating whether a response is possible or impossible is newly defined in a return signal from the lens unit in response to a command from the camera unit.

In the initial communication mode, as shown in FIG. 8, the start command, the lens specification request command, and the unit specification command are sent as DCTL codes from the camera unit to the lens unit.

At this time, if the lens unit knows this command, and can make a response, it sends back the return DLTC code shown in FIG. 9 to the camera unit. In this code, "0" is set in bit b7 of word 2, and pieces of designated information are set in word 4 to 9.

When the lens unit is of the 1st version, and commands transmitted from the camera unit are of the 2nd version, since the lens unit does not know these commands, it sets "1" in bit b7 of word 2 in the return DLTC code shown in FIG. 9 so as to inform this to the camera unit.

Since "1" is set in bit b7 of word 2 in the DLTC code in the initial communication mode, the camera unit determines that the lens unit is of the 1st version, and sends commands of an immediately lower version to the lens unit.

Since the commands coming next are of the 1st version, the lens unit can make a normal response.

In the control communication mode, as shown in FIG. 13, commands for controlling the respective units are sent to the lens unit.

When the lens unit does not know these commands, it sets "1" in bits b7 of word 2 and word 6 in the return DLTC code in the control communication mode shown in FIG. 14.

Thus, the camera unit can downgrade the version of commands by one, and can normally control the lens unit.

FIG. 16 shows the second embodiment.

In the embodiment shown in FIG. 15, only information indicating whether or not the lens unit can respond to the DCTL code from the camera unit is sent back to the camera unit. In this embodiment, version information is positively transmitted from the lens unit to the camera unit, and the camera unit can quickly select an optimal version to control the lens unit.

In this embodiment, version information is transmitted from the lens unit to the camera unit in the initial communication mode. In the control communication mode, control can be made using commands of an optimal version from the beginning.

More specifically, bit b5 to bit b7 in word 2 in each return DLTC code (FIGS. 9, 10, and 11) for DCTL communications including three commands, i.e., the start command, the lens specification request command, and the unit specification request command, in the initial communication mode shown in FIG. 8 are defined as shown in FIG. 16.

Furthermore, the contents of word 4 to word 9 in the DLTC code are switched according to the states of bit b5 to bit b7.

Bit b7 is a flag for requesting another command. When the lens unit requests the same command to the camera unit, it sets "1" in bit b7; otherwise, it sets "0" in bit b7. "1" is set in bit b7 to request the same command again when the DCTL code transmitted from the camera unit cannot be decoded due to, e.g., noise. Bit b7 set with "1" is also used for transmitting version information to the camera unit in cooperation with bit b5 and bit b6.

Bit b5 is a flag indicating the presence/absence of version-up. If the corresponding lens unit is manufactured under the condition of version-up of commands, "1" is set in bit b5; otherwise, "0" is set in bit b5.

Bit b6 is a version-up response flag. If the lens unit can respond to all the versions of commands, "0" is set in bit b6; otherwise, "1" is set in bit b6.

Combinations of the lens and camera units will be explained below.

① When both lens and camera units are of 1st version

Upon combination of the lens and camera units of the 1st version, bit b5, bit b6, and bit b7 are set to be all "0"s, and a state shown in (a) of FIG. 16 is set. Various pieces of control information before version-up are set in word 4 to word 9 in the formats shown in FIGS. 9, 10, and 11 according to the kinds of commands.

When the code of the DCTL command becomes one different from original information due to, e.g., noise, i.e., an unknown code for the lens unit, "0" is set in bit b5 and bit b6, and "1" is set in only bit b7, thereby issuing a request of another command to the camera unit, as shown in (b) of FIG. 16.

② When both lens and camera units are of 2nd version

Upon combination of the lens and camera units of the 2nd version, the camera unit sends commands of the latest version, i.e., the 2nd version to the lens unit as the DCTL signal in the initial communication mode.

Since the lens unit is manufactured under the condition of the 2nd version, it sets "1" in bit b5 of word 2 in the status signal DLTC in the initial communication mode. If the lens unit can respond to all the commands from the camera unit, it sets "0" in bit b6. In order to transmit this version information to the camera unit, the lens unit also sets "1" in bit b7.

In this case, as shown in (f) of FIG. 16, the operations of both the lens and camera units are controlled in the 2nd version.

In word 4 to word 9 in the DLTC communication information returned from the lens unit to the camera unit, version information associated with the received command is stored. As the version information, a version number, and flag information indicating possibility of a response to the corresponding version number can be stored.

Thus, control information communications of the 2nd version can be performed between the camera and lens units, and the lens unit can be controlled by commands from the camera unit.

Another case when both the lens and camera units are of the 2nd version will be described below.

More specifically, in this case, the lens unit cannot respond to all the commands of the 2nd version from the camera unit. In this case, as shown in (h) of FIG. 16, "1" is set in bit b5 and b7 in the same manner as in the above-mentioned case. However, since the lens unit cannot respond to all the commands of the 2nd version from the camera unit, "1" is set in bit b6 (if many versions are determined in future, and the lens unit need not respond to all the versions, "1" may be set in bit b5 and bit b6).

In this case, in word 4 to word 9 of the DLTC communication information to be returned from the lens unit to the camera unit, version information associated with the received command is stored. As the version information, a version number, and flag information indicating possibility of a response to the corresponding version number can be stored.

The camera unit sends the same command to the lens unit again.

The lens unit sets bit b5, bit b6, and bit b7 of word 2 to be all "0"s in turn, and stores prior information shown in FIGS. 9 to 11, i.e., information before version-up in word 4 to word 9 according to the kind of command. The code of word 2 used when prior information is to be sent is the same as that of the 1st version.

More specifically, a command, which has not undergone version-up, of the three commands in the initial communication mode has the same communication content as that used upon combination of the lens and camera units of the 1st version.

In the control communication mode, optimal commands are sent to the lens unit on the basis of the obtained version information.

③ When lens unit of 1st version is combined with camera unit of 2nd version

When the lens unit of the 1st version is combined with the camera unit of the 2nd version, the camera unit sends a command of the 2nd version to the lens unit in the initial communication mode.

Since the lens unit does not know this command, it sets "1" in bit b7 of word 2, and sends back a status signal to the camera unit.

In this case, all "0"s are set in word 4 to word 9.

In the case of the lens unit of the 1st version, "0" is set in both bit b5 and bit b6.

Since the camera unit can recognize based on the above-mentioned information that the lens unit is of the 1st version, it sends a command of the 1st version in the next field. The lens unit sets "0" in bit b7 of the DLTC communication information, and stores prior information before version-up in word 4 to word 9.

④ When lens unit of 2nd version is combined with camera unit of 1st version

Finally, when the lens unit of the 2nd version is combined with the camera unit of the 1st version, the camera unit sends a command of the 1st version in the initial communication mode. Since the lens unit can recognize that the camera unit is of the 1st version, it can set all "0"s in bit b5 to bit b7 of word 2 in the same manner as the lens unit of the 1st version, and can store prior information before version-up in word 4 to word 9.

In this manner, according to the present invention, even when the lens and camera units have different versions, the version of the lens unit can be recognized in the initial communication mode, and control can be made in correspondence with the recognized version. Therefore, confusion of the control system caused by a difference in version can be prevented. Furthermore, version-up in future can be coped with.

According to the above-mentioned embodiment, version information is stored in the lens unit, and is sent back in response to a request from the camera unit. Alternatively, version information of the camera unit may be stored in the camera unit, and may be transmitted to the lens unit in the initial communication mode, thereby stating the version first. In response to this information, the lens unit may send back information indicating possibility of a response. In bidirectional communications, various other communication formats may be employed.

As described above, according to the video camera apparatus of the present invention, since the lens unit sends, to the camera unit, information indicating whether a response to a command is possible or impossible, even when the lens and camera units having different versions are combined, compatibility can be assured without causing an erroneous operation and an uncontrollable state.

FIG. 17 shows the third embodiment of the present invention. In this embodiment, a flag indicating whether a response to a command from a camera unit is possible or impossible is newly defined in a return signal from a lens unit in response to the command from the camera unit, and a table representing versions supported by the lens unit is defined.

In an initial communication mode, as shown in FIG. 8, a start command, a lens specification request command, and a unit specification request command are sent from the camera unit to the lens unit as DCTL codes.

The above-mentioned flag is defined by bit b6 and bit b7 of word 2 in return information sent back from the lens unit in a DLTC communication in response to a DCTL communication for sending the start command, the lens specification request command, and the unit specification request command from the camera unit.

More specifically, bit b6 represents the presence/absence of version-up of the lens unit, and bit b7 represents the presence/absence of a request of another command to the camera unit (in only the initial communication mode). Bit b6 and bit b7 are defined as follows:

*bit b6="0": absence of version-up
 bit b6="1": presence of version-up
*bit b7="0": no request of another command
 bit b7="1": request of another command (in only initial communication mode)

If bit b6="0", this means that the lens unit has not undergone version-up, and is of the 1st version; if b6="1", this means that the lens unit has undergone version-up.

Bit b7 is a flag for requesting another command. When the lens unit requests the same command to the camera unit, it sets "1" in bit b7; otherwise, it sets "0" in bit b7. "1" is set in bit b7 to request the same command again when a DCTL code transmitted from the camera unit cannot be decoded due to, e.g., noise. Bit b7 set with "1" is also used when "1" is set in bit b6 to indicate the presence of version-up.

In order to actually transmit version number information from the lens unit to the camera unit, word 4 to word 9 in the DLTC information in the initial communication mode are used.

FIG. 17 shows a table of information representing the version of the lens unit, which is formed by using word 4 to word 9 in DLTC information sent back from the lens unit to the camera unit in response to a DCTL communication including the start command, the lens specification request command, and the unit specification request command from the camera unit in the initial communication mode.

Numeric value data assigned to addresses defined by positions corresponding to bits of word 4 to word 9 represent version numbers. In this embodiment, 49 different versions, i.e., version 1 to version 49, are assigned.

Note that version 1 is always supported, and no address is assigned thereto. Therefore, if data in the version information table are all "0"s, this means that the lens unit is of version 1, i.e., of the 1st version without version-up.

In order to designate these versions, "1" is set in bits of words to which the corresponding version numbers are assigned, and "0" is set in bits of words to which unsupported version numbers are assigned.

When this information is transmitted to the camera unit, the camera unit can recognize the version of commands supported by the lens unit.

FIG. 18 shows DLTC information used when information indicating versions supported by the lens unit is transmitted to the camera unit.

As described above, versions corresponding to "1"s set in assignment addresses designated by word 4 to word 9 and bit b0 to bit b7 are supported. As can be seen from collation of these addresses with FIG. 17, the version numbers 1, 2, 4, 6, 9, and 13 are supported.

An actual operation will be described below. When an initial communication for initialization is started between the camera unit and the lens unit, the camera unit performs DCTL communications including the start command, the lens specification request command, and the unit specification request command in the initial communication mode shown in FIG. 8 to the lens unit.

The lens unit describes using bit b6 and b7 in word 2 in DLTC codes (FIGS. 9, 10, and 11) as return signals whether or not responses to the commands in the DCTL communications from the camera unit are possible, and sends back these return signals to the camera unit.

In this case, when the lens unit is a lens of the 1st version, i.e., a lens which has not undergone version-up, in other words, when data in the table shown in FIG. 18 representing the support relationship of pieces of information of the version information table shown in FIG. 17 are all "0"s, the lens unit sets flag "0" indicating the absence of version-up in bit b6 of word 2 in DLTC information, and sets "0" in bit b7 as the flag for requesting another command so as not to request another command. Thus, the lens unit sends back this information to the camera unit.

In this case, a status signal representing normal initial control information is set in word 4 to word 9, as shown in FIGS. 9, 10, and 11, and no version information shown in FIG. 18 is transmitted.

Even when the lens unit is of the 1st version, and bit b6="0", if the DCTL communication from the camera unit cannot be decoded due to, e.g., noise, "1" is set in bit b7 to issue the request for another command.

In the initial communication mode, when the lens unit is a lens which has undergone version-up, i.e., when a version other than the 1st version is supported, and "1"s are set in the table formed by word 4 to word 9 shown in FIG. 18, the lens unit sets "1" in bit b6 of word 2 as the flag indicating the presence/absence of version-up, and also sets "1" in bit b7 to issue the request for another command. Thus, the lens unit sends back to the camera unit these pieces of information in a DLTC communication of return information for the initial communication command from the camera unit. At this time, information representing the presence/absence of support for various version numbers is set in word 4 to word 9 in DLTC information, as shown in FIG. 18, and the DLTC information is sent back.

The camera unit receives the return DLTC information, recognizes the version of the lens unit, and transmits again various commands such as the start command, the lens specification request command, the unit specification request command, and the like using commands which have undergone version-up, thereby requesting the start command, specifications of the lens unit, and specifications of control units in the lens unit, as shown in FIGS. 9, 10, and 11.

Upon completion of these initialization operations, the control communication mode shown in FIGS. 13 and 14 is started.

In this manner, according to the present invention, even when the lens and camera units have different versions, the camera unit can quickly select an optimal version on the basis of version information in the initial communication mode so as to control the lens unit. Thus, confusion of a control system due to a difference in version can be prevented. Furthermore, version-up in future can be coped with.

According to the above-mentioned embodiment, version information is stored in the lens unit, and is sent back in response to a request from the camera unit. Alternatively, version information of the camera unit may be stored in the camera unit, and may be transmitted to the lens unit in the initial communication mode, thereby stating the version first. In response to this information, the lens unit may send back information indicating possibility of a response. In bidirectional communications, various other communication formats may be employed.

As described above, according to the video camera apparatus of the present invention, since the lens unit sends, to the camera unit, information indicating whether a response to a command is possible or impossible, and supported version information, even when the lens and camera units having different versions are combined, compatibility can be assured without causing an erroneous operation and an uncontrollable state.

What is claimed is:

1. A video camera apparatus, which comprises:

a camera unit;

a lens unit detachable from said camera unit; and communication means for communicating control information between a computer of said camera unit and a computer of said lens unit, wherein at least one of said camera unit and said lens unit comprises means for storing information indicating a version of the control information by which both of said camera unit and said lens unit can communicate with each other for control, and the information representing the version can be transmitted by said communication means to the other unit to vary or select the version of the control information.

2. A video camera apparatus, which comprises:

a camera unit;

a lens unit detachable from said camera unit;

communication means for communicating control information between a computer of said camera unit and a computer of said lens unit, wherein at least one of said camera unit and said lens unit includes an information table for storing information indicating a version of the control information by which said camera unit and said lens unit can change or select the version of control information; and means operative for, when the control information is communicated by said communication means from at least one of said camera unit and said lens unit to the other, setting a discrimination flag indicating whether or not the version of the control information communicated by said communication means is the version indicated by said information stored in said information table.

3. An apparatus according to claim 2, wherein said communication means transmits the information representing the version in an initial communication between said camera unit and said lens unit.

4. An apparatus according to claim 1, wherein said information is stored in said lens unit.

5. An apparatus according to claim 4, wherein said information is written in a predetermined word which is transmitted from the computer of said lens unit to the computer of said camera unit during initial communication.

6. An apparatus according to claim 4, wherein said information includes information as to version-up, information as to whether the version can respond to a control command output from the camera unit, and contents of the version.

7. An apparatus according to claim 1, wherein the computer of said camera unit changes a control command to be transmitted to said lens unit, on the basis of said information transmitted from the computer of said lens unit.

8. An apparatus according to claim 7, wherein said camera unit generates a re-request of the command when said lens unit can not use the version of the control information.

9. An apparatus according to claim 2, wherein said information is stored in said lens unit.

10. An apparatus according to claim 9, wherein said information is written in a predetermined word which is transmitted from the computer of said lens unit to the computer of said camera unit during initial communication.

11. An apparatus according to claim 10, wherein said information includes information as to version-up, information as to whether the version can respond to a control command output from the camera unit and contents of the version.

12. An apparatus according to claim 11, wherein the computer of said camera unit changes a control command to be transmitted to said lens unit on the basis of said information transmitted from the computer of said lens unit.

13. A camera apparatus with an interchangeable lens unit, comprising:

(a) communication means for transmitting control information for driving the lens unit, to the lens unit mounted on said camera apparatus and for receiving version information for control information supported by the lens unit, from the lens unit during communication for initialization; and (b) control means for selecting the version of the control information to be transmitted to the lens unit, according to the version information received from the lens unit.

14. An apparatus according to claim 13, wherein the version information includes information as to version up information as to whether the version can respond to a control command output from the camera unit and contents to the version.

15. An apparatus according to claim 14, wherein said camera apparatus generates a re-request of a command when the version of the lens unit is not the same as the version of said camera apparatus.

16. An apparatus according to claim 13, wherein the control information is a driving command for controlling of auto-focusing, auto-exposure and zooming.

17. A lens unit detachable to a camera body, comprising:

(a) driving means for effecting optical change of image pickup condition;

(b) communication means for communicating control information between said camera body and said lens unit; and (c) control means for controlling said driving means according to the control information communicated from said camera body through said communication means, said control means being arranged so as to transmit the version information of decodable control information to said camera body by said communication means during communication for initialization to cause said camera body to change the version of the control information to be transmitted to the lens unit.

18. A lens unit according to claim 17, wherein the version information is stored in a ROM and is read out from said ROM in response to a request from said camera body in order to be transmitted to said camera body.

19. A lens unit according to claim 17, wherein said driving means includes a focus motor for driving a focus lens, a zoom motor for driving a zoom lens and an IG meter for controlling an iris.

* * * * *

UNITED STATES PATENT AND TRADEMARK OFFICE
CERTIFICATE OF CORRECTION

PATENT NO. : 5,608,457
DATED : March 4, 1997
INVENTOR(S) : Tohyama et al.

It is certified that error appears in the above-identified patent and that said Letters Patent is hereby corrected as shown below:

Col. 7, line 34, delete "word and word 1" and insert -- word 0 and word 1 --.

Signed and Sealed this

Ninth Day of June, 1998

Attest:

BRUCE LEHMAN

Attesting Officer     Commissioner of Patents and Trademarks